United States Patent
Homrighaus

(10) Patent No.: US 11,827,484 B1
(45) Date of Patent: Nov. 28, 2023

(54) CURED-IN-PLACE-PIPE (CIPP) END CAP INTERNAL ROLLER APPARATUS

(71) Applicant: Omega Liner Company, Inc., Canton, SD (US)

(72) Inventor: Jason Homrighaus, Canton, SD (US)

(73) Assignee: Omega Liner Company, Inc., Canton, SD (US)

( * ) Notice: Subject to any disclaimer, the term of this patent is extended or adjusted under 35 U.S.C. 154(b) by 0 days.

(21) Appl. No.: 18/153,712

(22) Filed: Jan. 12, 2023

(51) Int. Cl.
*F16L 55/18* (2006.01)
*B65H 51/08* (2006.01)
*F16L 55/115* (2006.01)

(52) U.S. Cl.
CPC ............ *B65H 51/08* (2013.01); *F16L 55/115* (2013.01); *B65H 2402/30* (2013.01); *B65H 2601/254* (2013.01)

(58) Field of Classification Search
CPC ... F16L 55/115; B65H 51/08; B65H 2402/30; B65H 2601/254
USPC ......................... 138/97, 98; 405/150.1, 184.2
See application file for complete search history.

(56) References Cited

U.S. PATENT DOCUMENTS

| | | | |
|---|---|---|---|
| 2,548,616 A * | 4/1951 | Priestman | E21B 19/22 175/203 |
| 4,385,885 A * | 5/1983 | Wood | B29C 63/36 264/516 |
| 4,668,125 A | 5/1987 | Long, Jr. | |
| 4,685,983 A | 8/1987 | Long, Jr. | |
| 4,773,666 A | 9/1988 | Koberlein | |
| 4,863,365 A | 9/1989 | Ledoux | |
| 5,092,756 A * | 3/1992 | Gau | B29C 53/086 425/383 |
| 5,201,406 A | 4/1993 | Kellis | |
| 5,358,359 A | 10/1994 | Long, Jr. | |
| 5,374,174 A * | 12/1994 | Long, Jr. | B29C 63/36 405/184.2 |

(Continued)

FOREIGN PATENT DOCUMENTS

DE    19702854 A1    7/1998

OTHER PUBLICATIONS

Pictures of Applicant's End Cap Internal Roller Product; Mar. 2021.

(Continued)

*Primary Examiner* — James F Hook
(74) *Attorney, Agent, or Firm* — Neustel Law Offices

(57) ABSTRACT

A cured-in-place-pipe (CIPP) end cap internal roller apparatus is disclosed. The apparatus can include a housing having an opening, wherein the housing can further include an interior space. In addition, the apparatus can include a roller assembly, wherein the roller assembly is at least partially disposed within the interior space of the housing and at least partially disposed through the opening of the housing. Further, the apparatus may include a grommet seal coupled to an upper region or side region of the housing, wherein the seal includes an opening. Further, the opening of the grommet seal may be at least partially aligned with the roller assembly. The roller assembly may further include a plurality of rollers or rotatable members secured between a first bracket and a second bracket, wherein the first bracket and second bracket each include an at least partial arcuate configuration.

16 Claims, 18 Drawing Sheets

(56) References Cited

U.S. PATENT DOCUMENTS

| | | | |
|---|---|---|---|
| 5,503,190 A * | 4/1996 | Kamiyama | F16L 55/165 |
| | | | 138/108 |
| 5,816,293 A * | 10/1998 | Kiest, Jr. | F16L 55/179 |
| | | | 264/269 |
| 6,058,978 A * | 5/2000 | Paletta | F16L 55/1654 |
| | | | 138/DIG. 7 |
| 6,089,276 A * | 7/2000 | Miyazaki | F16L 55/165 |
| | | | 264/269 |
| 6,390,795 B1 | 5/2002 | Waring | |
| 6,423,258 B1 | 7/2002 | Thompson | |
| 6,439,445 B1 | 8/2002 | De Groot | |
| 6,450,752 B1 * | 9/2002 | Hill | B26D 7/0625 |
| | | | 198/429 |
| 6,960,313 B2 | 11/2005 | Waring | |
| 7,374,127 B2 | 5/2008 | Gallagher | |
| 7,476,348 B2 | 1/2009 | Waring | |
| 7,682,106 B1 | 3/2010 | Bowar | |
| 7,988,437 B1 | 8/2011 | Bonanotte | |
| 8,038,913 B2 | 10/2011 | Driver | |
| 8,418,336 B2 | 4/2013 | Bennett | |
| 9,534,726 B1 | 1/2017 | Strom | |
| 9,927,059 B2 | 3/2018 | Penza | |
| 10,550,988 B2 | 2/2020 | Strom | |
| 11,262,015 B2 | 3/2022 | Homrighaus | |
| 2002/0163102 A1 | 11/2002 | Thompson | |
| 2003/0024858 A1 | 2/2003 | Stibbard | |
| 2003/0146333 A1 | 8/2003 | Couchey | |
| 2003/0209823 A1 | 11/2003 | Waring | |
| 2006/0093436 A1 * | 5/2006 | Gearhart | B29C 63/36 |
| | | | 405/184.2 |
| 2007/0029688 A1 | 2/2007 | Delaney | |
| 2011/0180639 A1 | 7/2011 | Lester | |
| 2012/0199276 A1 | 8/2012 | Rodenberger | |
| 2012/0207548 A1 * | 8/2012 | Beck | F16L 55/1651 |
| | | | 405/184.2 |
| 2012/0273607 A1 | 11/2012 | Bensen, IV | |
| 2013/0263443 A1 | 10/2013 | Delaney | |

OTHER PUBLICATIONS

Drawings of Applicant's End Cap Internal Roller Product; Mar. 2021.

http://cipp-services.com/refrigerated-trucks.html; Webpage from CIPP Services, Inc. for Refrigerated Liner Unloader Trailers; Apr. 16, 2013.

http://cipp-services.com/air-inverters.html; Webpage from CIPP Services, Inc. for Air-Inverters-Shooters; Apr. 13, 2013.

* cited by examiner

CURED-IN-PLACE-PIPE (CIPP) END CAP INTERNAL ROLLER APPARATUS

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND

This section is intended to introduce the reader to aspects of art that may be related to various aspects of the present disclosure described herein, which are described and/or claimed below. This discussion is believed to be helpful in providing the reader with background information to facilitate a better understanding of the various aspects of the present disclosure described herein. Accordingly, it should be understood that these statements are to be read in this light, and not as admissions of prior art.

Cured-in-place-pipe (CIPP) liners, such as ultra-violet or blue light cured pipe rehabilitation liners, have been used for many years for the rehabilitation of different types and sizes of conduit and piping systems such as utility, sewer, water, electric, telecom, industrial, petroleum, fire suppression, heating, cooling and the like. The majority of materials used to manufacture these liners are felt and fleece type fabrics which have a thin flexible PVC or Polyurethane type jacket coating on one side. The liners can typically be impregnated with a thermosetting type resin and then installed by inverting the liner inside of a host conduit or a pipe using pressurized air or water.

Installation of these ultra-violet or blue light cured liners require that the pipe be sealed at both ends while still providing the ability to pass ropes, cables, cords, and other devices from external ambient atmospheric pressure to the elevated internal pressure of the liner interior. Typically, an end cap installed at one end of a pipe can allow a user to pass ropes or cables through the pipe or liner. As dictated by conditions of the installation, the cables or ropes may be required to exit the end cap in a parallel direction or in a perpendicular direction from that of the pipe.

Traditionally, a grommet seal is affixed to the face of the end cap and a directional roller apparatus is then attached by various means to the face of the end cap such that the cable or rope is smoothly transitioned from a parallel to a perpendicular direction. The directional roller apparatus generally requires a certain minimum radius of curvature to ensure damage does not occur to the cable or rope. As such, the conventional roller apparatus must protrude some distance beyond the face of the end cap, in which depending on the installation conditions, may result in interference with underground structures or other obstacles.

Hence, what is needed is an improved roller apparatus that requires minimal lateral space and reduces the extension needed beyond the end cap, thereby allowing for greater flexibility and useability for CIPP installation personnel.

SUMMARY

Some of the various exemplary embodiments of the present disclosure relate to a CIPP end cap internal roller apparatus for passing one or more cords, cables, or ropes therethrough the end cap of a pipe. Some advantages of the apparatus of the disclosure described herein can include allowing for sealing operations to be performed in tight below ground areas, as compared to conventional roller assemblies. In addition, an operator of the apparatus can choose a desired angle (such as an exit angle) for a cable, line, or rope that is being passed through the apparatus of the disclosure described herein, such as in a vertical orientation or horizontal orientation, thereby providing additional ease of use, faster installation, and minimizing down time in CIPP sealing operations.

In some exemplary embodiments, a pipe end cap roller apparatus is disclosed. The apparatus can include a housing having an opening, wherein the housing can further include an interior space. In addition, the apparatus can include a roller assembly, wherein the roller assembly is at least partially disposed within the interior space of the housing and at least partially disposed through the opening of the housing, and wherein the roller assembly comprises a plurality of rotatable members assembled in a curved orientation and secured between a first bracket and a second bracket, wherein a bottom surface of each of the first bracket and second bracket comprise an arcuate configuration that follows the curved orientation of the rotatable members. Further, the apparatus may include a grommet seal coupled to an upper region or side region of the housing, wherein the seal includes an opening. Further, the opening of the grommet seal may be at least partially aligned with the roller assembly. Further, the first bracket and second bracket each comprise a slot or channel near their middle regions. Further, the apparatus can include a pipe coupling member coupled to the opening of the housing, wherein the pipe coupling member comprises an interior space. Also, the first bracket and second bracket can each further include a proximal end and a distal end, wherein the proximal end of each first bracket and second bracket is disposed within the interior space of the pipe coupling member and the distal end of each first and second bracket is disposed within the interior space of the housing.

In addition, the pipe end cap roller apparatus may further include a third bracket, wherein the third bracket can be secured to the first bracket and second bracket and disposed within each slot or channel of the first bracket and second bracket. Also, the housing may further include a first plate and the pipe coupling member may include a second plate. In addition, the third bracket may be coupled to the first plate and second plate, and further disposed between the first plate and second plate. Further, the third bracket may include a first arcuate member and a second arcuate member, wherein the first arcuate member is adapted to engage a lower region of the first bracket and the second arcuate member is adapted to engage a lower region of the second bracket member. In addition, the pipe end cap roller apparatus may further an air manifold member in fluid communication with the interior space of the housing.

In other exemplary embodiments, a pipe end cap roller system is disclosed. The pipe end cap roller system can include a casing having a pressure sealed interior compartment, wherein the casing can further include a coupling member, wherein the coupling member is at transverse orientation relative to the casing. In addition, the system can include a grommet seal coupled to the casing. Further, the system can include a roller assembly coupled to the casing and at least partially disposed within the casing, wherein the roller assembly comprises a plurality of wheels or rollers disposed in a curved configuration relative to a horizontal and vertical plane. In addition, the wheels or rollers can be secured between a first bracket and a second bracket, wherein a lower region of each of the first bracket and second bracket comprise an arcuate configuration that substantially follows the curved configuration of the wheels or rollers. Here, the grommet seal can be coupled to an upper region or side region of the casing. In addition, the upper or side region of the casing may each include a pair of flanged members, wherein the pair of flanged members are configured to secure the grommet seal.

Further, the grommet seal may include an orifice adapted to receive a cable or line therethrough, and wherein the orifice is at least partially aligned with the roller assembly such that the cable or line is axially aligned with the orifice. In addition, the first bracket and second bracket each comprise a slot or channel near their middle regions. Also, the first and second brackets can each further include a proximal end and a distal end, wherein the proximal end of each first bracket and second bracket is disposed within the interior space of the coupling member and the distal end of each first bracket and second bracket is disposed within the interior space of the casing. The pipe end cap roller system can further include a third bracket, wherein the third bracket can be secured to the first bracket and second bracket. In addition, the casing may further include a first plate and the coupling member include a second plate. Here, the third bracket may be coupled to the first plate and second plate and further disposed between the first plate and second plate.

In other exemplary embodiments, a pipe end cap roller system is disclosed. The system can include a body, wherein the body can include a top opening, a first side opening, and a second side opening. The system can further include a cover secured to either the top opening or first side opening of the body, and a grommet seal having an opening secured to either the top opening or first side opening of the body. In addition, the system can include the body further including a flanged member, wherein the flanged member can be secured to the second side opening of the body. Also, the system may include a plurality of rotatable members at least partially disposed within an interior space of the body in a curved orientation, wherein the plurality of rotatable members are secured between a first bracket and a second bracket, wherein the first bracket and second bracket each comprise a bottom face in an arcuate configuration that substantially follows the curved orientation of the plurality of rotatable members.

There has thus been outlined, rather broadly, some of the embodiments of the present disclosure in order that the detailed description thereof may be better understood, and in order that the present contribution to the art may be better appreciated. There are additional embodiments that will be described hereinafter and that will form the subject matter of the claims appended hereto. In this respect, before explaining at least one embodiment in detail, it is to be understood that the various embodiments are not limited in its application to the details of construction or to the arrangements of the components set forth in the following description or illustrated in the drawings. Also, it is to be understood that the phraseology and terminology employed herein are for the purpose of the description and should not be regarded as limiting.

To better understand the nature and advantages of the present disclosure, reference should be made to the following description and the accompanying figures. It is to be understood, however, that each of the figures is provided for the purpose of illustration only and is not intended as a definition of the limits of the scope of the present disclosure. Also, as a general rule, and unless it is evidence to the contrary from the description, where elements in different figures use identical reference numbers, the elements are generally either identical or at least similar in function or purpose.

DETAILED DESCRIPTION

Unless otherwise defined, all technical and scientific terms used herein have the same meaning as commonly understood by one of ordinary skill in the art to which this invention belongs. Although methods and materials similar to or equivalent to those described herein can be used in the practice or testing of the various embodiments of the present disclosure, suitable methods and materials are described above. All patent applications, patents, and printed publications cited herein are incorporated herein by reference in their entireties, except for any definitions, subject matter disclaimers or disavowals, and except to the extent that the incorporated material is inconsistent with the express disclosure herein, in which case the language in this disclosure controls. The various embodiments of the present disclosure may be embodied in other specific forms without departing from the spirit or essential attributes thereof, and it is therefore desired that the various embodiments in the present disclosure be considered in all respects as illustrative and not restrictive. Any headings utilized within the description are for convenience only and have no legal or limiting effect.

In the Summary of the present disclosure above and in the Detailed Description of the disclosure described herein, and the claims below, and in the accompanying drawings, reference is made to particular features (including method steps) of the disclosure described herein. It is to be understood that the disclosure of the disclosure described herein in this specification includes all possible combinations of such particular features. For example, where a particular feature is disclosed in the context of a particular aspect or embodiment of the disclosure described herein, or a particular claim, that feature can also be used, to the extent possible, in combination with and/or in the context of other particular aspects and embodiments of the disclosure described herein, and in the disclosure described herein generally.

The embodiments set forth below represent the necessary information to enable those skilled in the art to practice the disclosure described herein and illustrate the best mode of practicing the disclosure described herein. In addition, the disclosure described herein does not require that all the advantageous features and all the advantages need to be incorporated into every embodiment of the disclosure described herein.

A. Overview

Figure 1:
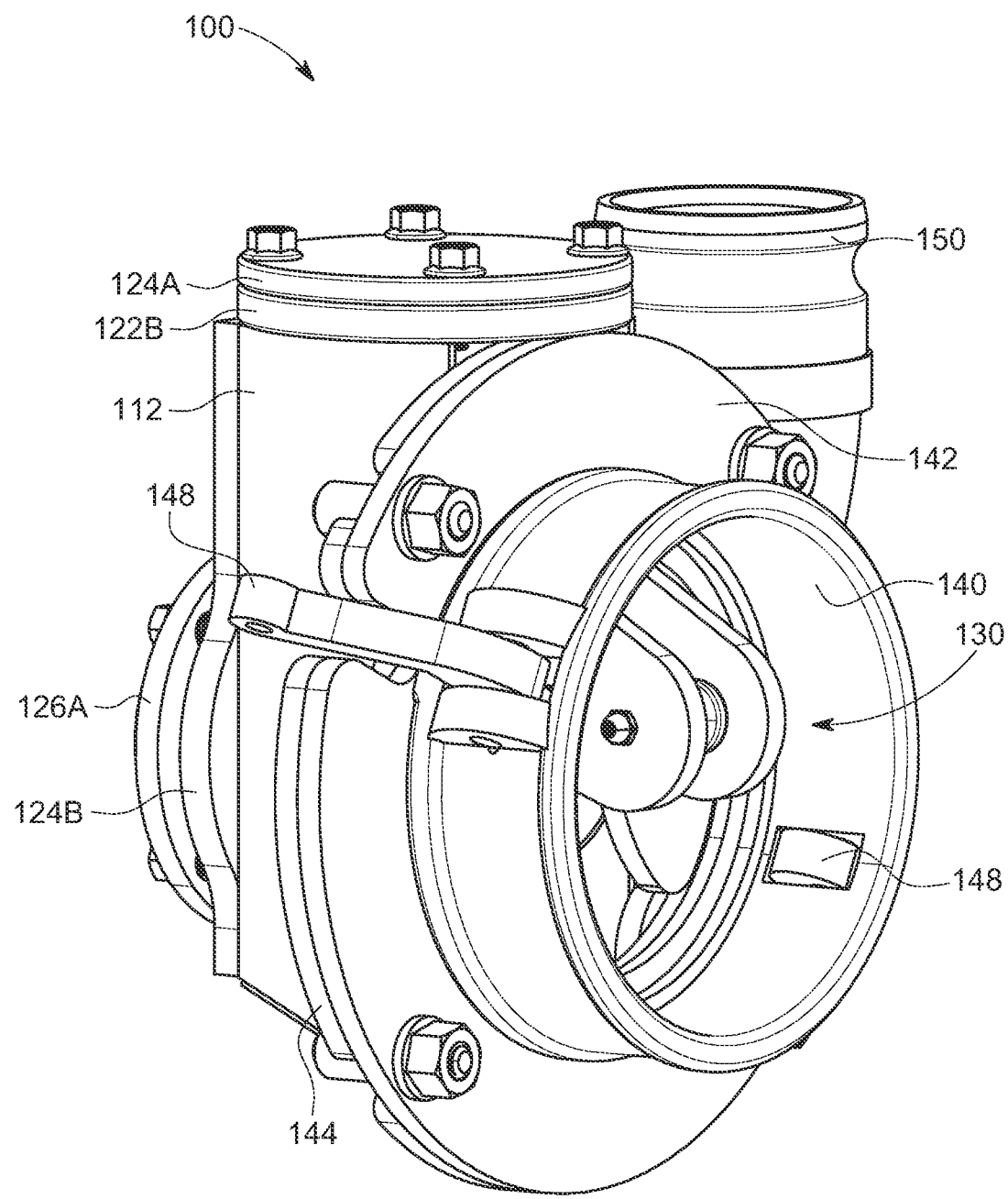
FIG. 1 illustrates a perspective front view of the CIPP end cap internal roller apparatus of the disclosure described herein according to some exemplary embodiments.
Figure 2:
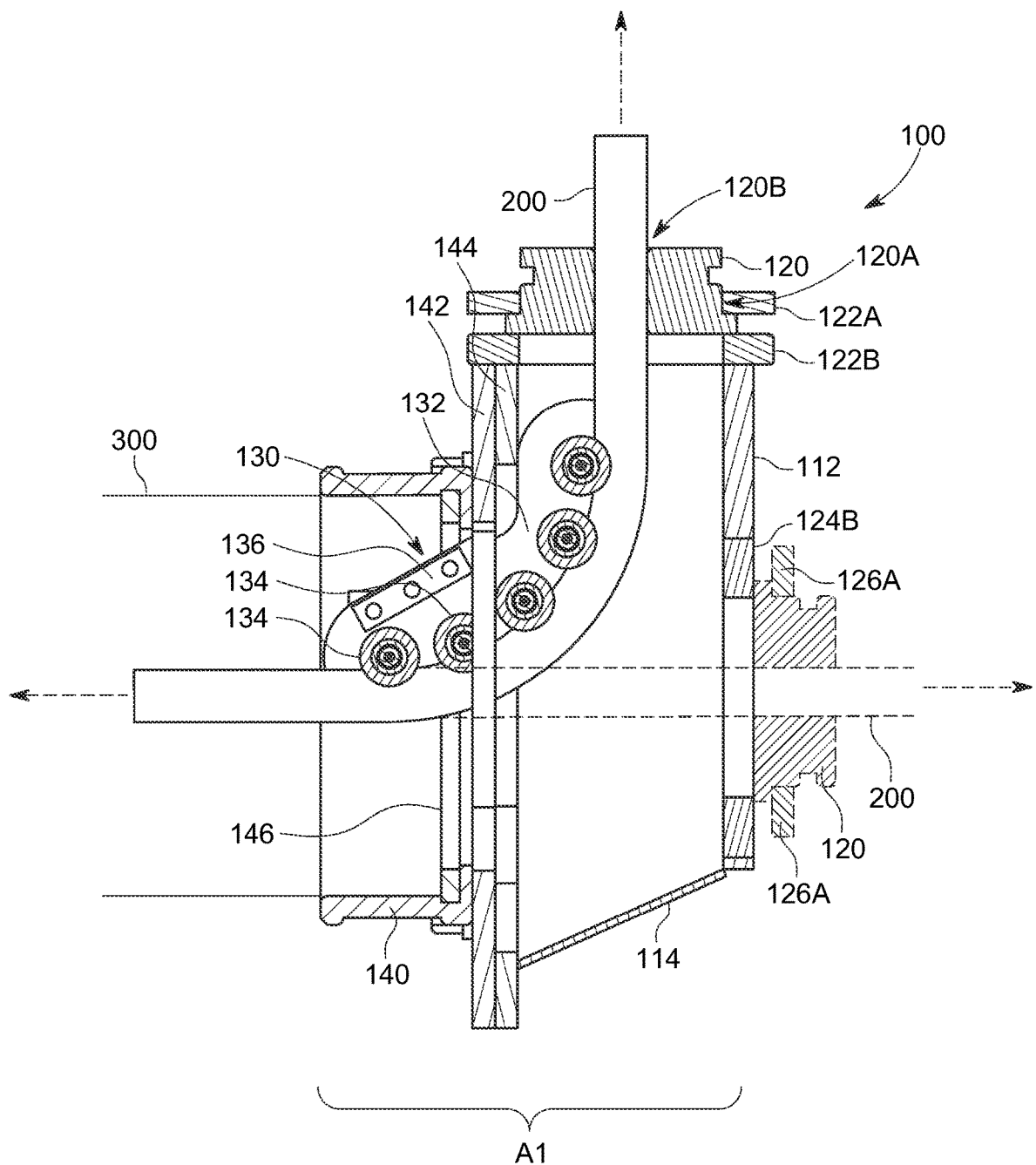
FIG. 2 illustrates a simplified partial cross-sectional view for the CIPP end cap internal roller apparatus of the disclosure described herein according to some exemplary embodiments.
Figure 3:
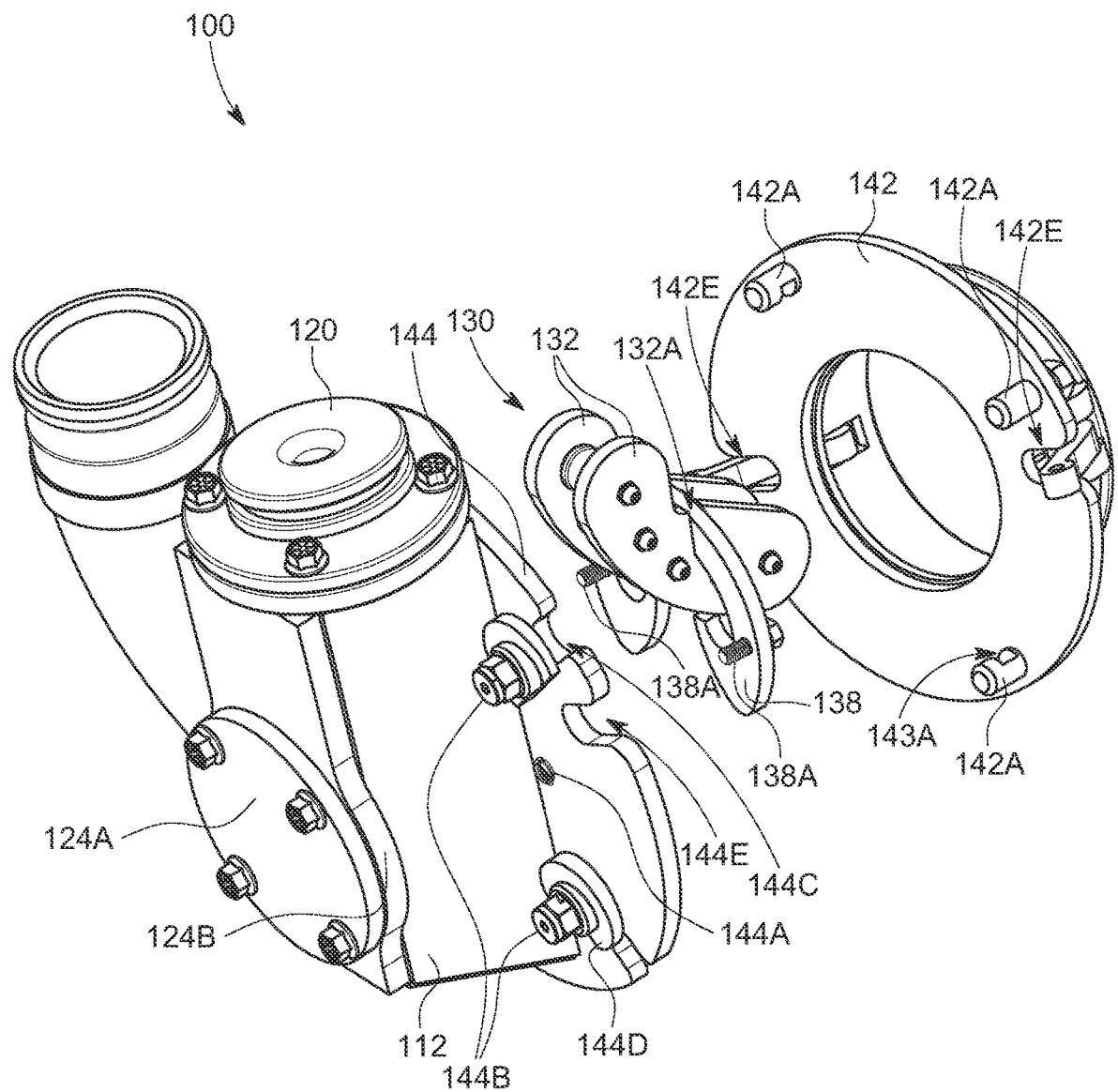
FIG. 3 illustrates a partial exploded view for the CIPP end cap internal roller apparatus of the disclosure described herein according to some exemplary embodiments.
Figure 4A:
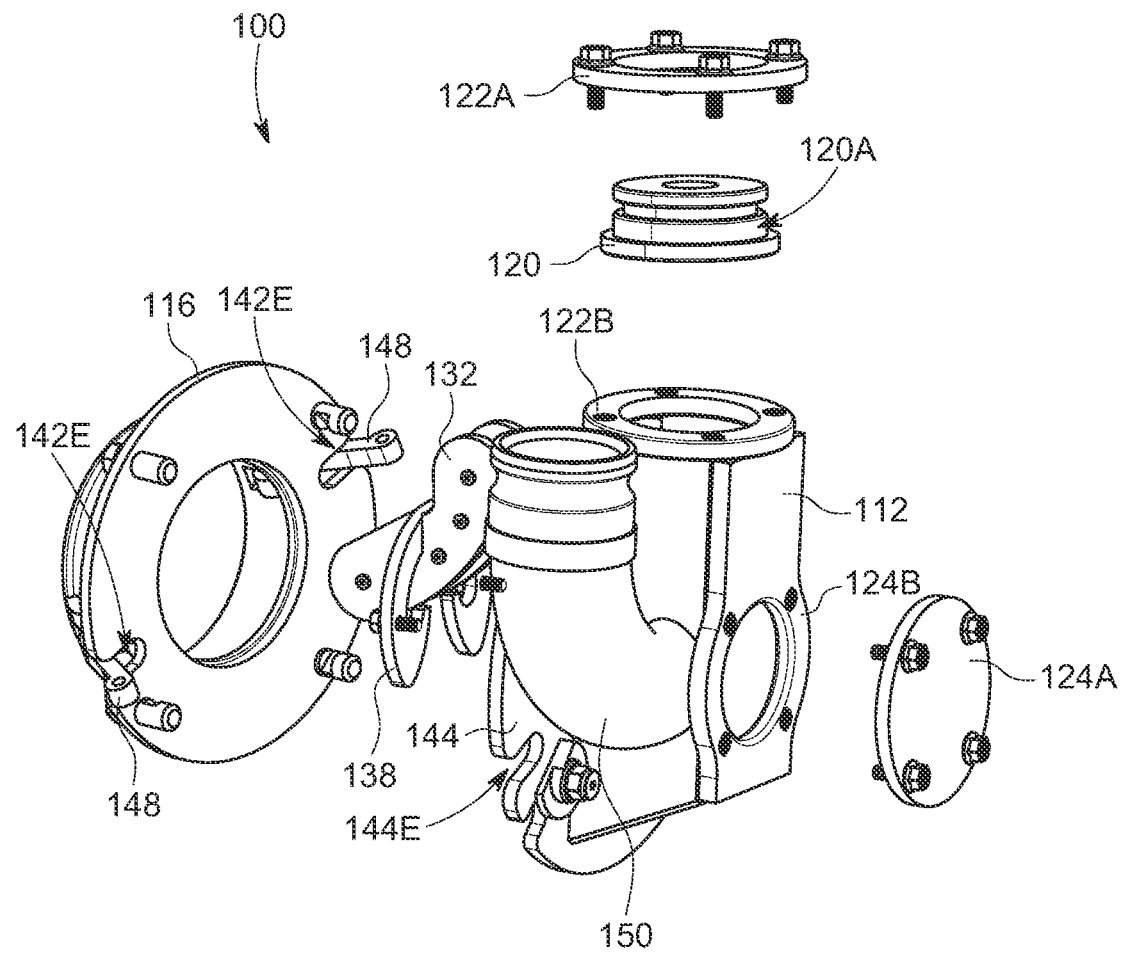
FIG. 4A illustrates another partial exploded view for the CIPP end cap internal roller apparatus of the disclosure described herein according to some exemplary embodiments.
Figure 4B:
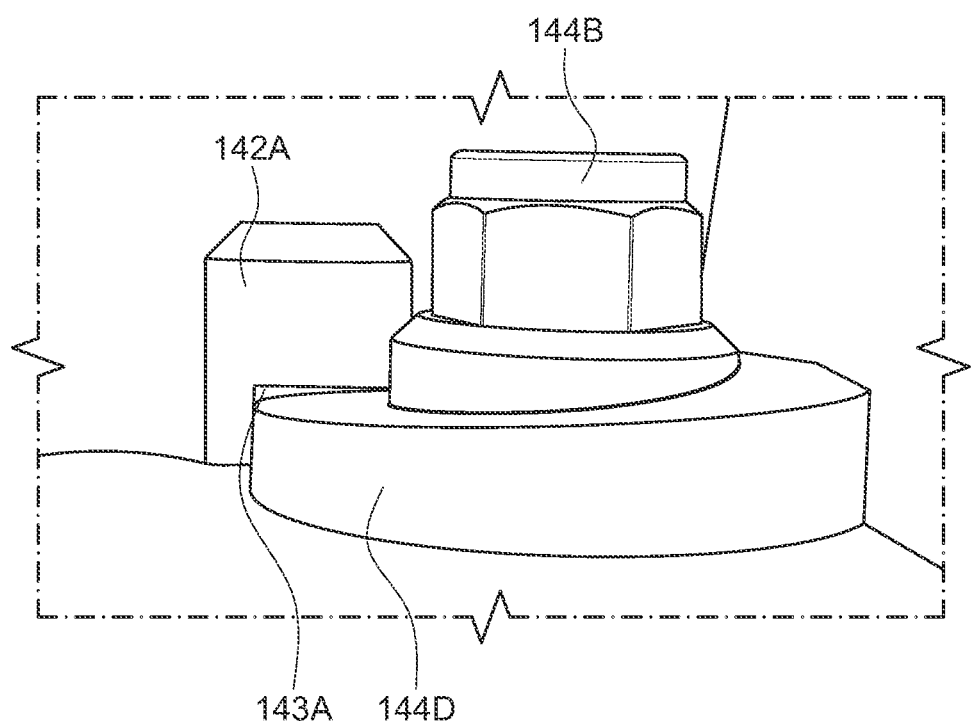
FIG. 4B illustrates a partial close-up view for the CIPP end cap internal roller apparatus of the disclosure described herein according to some exemplary embodiments.

FIGS. 1-18 illustrate various views according to various exemplary embodiments of the CIPP end cap internal roller apparatus 100 of the disclosure described herein. Referring to FIG. 1, in general, apparatus 100 can include a main body, casing, or housing 112 having a flanged plate 144 that is coupled to an external pipe end cap mount or flanged end cap pipe coupling member or connector 140, wherein an interior space of housing 112 and connector 140 have roller assembly 130 at least partially disposed therein. Moreover, housing 112 can include a flange receiving member 122B at its top region. Similarly, housing 112 can also include a flange receiving member 124B at its rear or side region. Here, flange 122B can be configured to secure to covered end cap cover 124A or open ringed flange member 122A for supporting a sealed grommet 120, such as shown in FIGS. 2-4. Similarly, flange 124B can be configured to secure to end cap cover 124A or open ringed flange member 126A, such as shown optionally shown FIGS. 2 and 4-8. In addition, plate 144 of housing 112 can be further secured to plate 142 via a pair of latching members 148 adapted to secure apparatus 100 to end cap 300, such as shown in FIG. 18. Apparatus 100 can further include an air inlet piping or manifold 150 that is in fluid communication with the interior space of housing 112, which may be used for the injection or purging/venting of air.

Referring to FIG. 2, a partial cross-sectional side view for the CIPP end cap internal roller apparatus 100 of the disclosure described herein is shown. Here, apparatus 100 is generally adapted to support the feeding of one or more lines, wires, cords, ropes, or cables from above ground atmospheric pressure into a pressurized liner and piping system or end cap 300 via roller assembly 130, wherein the interior space of housing 112 and flanged connector 140 are pressurized at the same or substantially the same pressure of piping system or end cap 300. In some embodiments, apparatus 100 may include a grommet seal 120 disposed at either its top end region, rear/side region, or both, to support the feeding of cable therethrough. However, it is preferred that either the top end (via member 122B) or the rear/side end (via member 124B) includes a grommet seal 120 with the opposing end being closed or capped (via end cap 124A) at a given time in order to properly maintain proper pressure within the interior space of apparatus 100.

Figure 5:
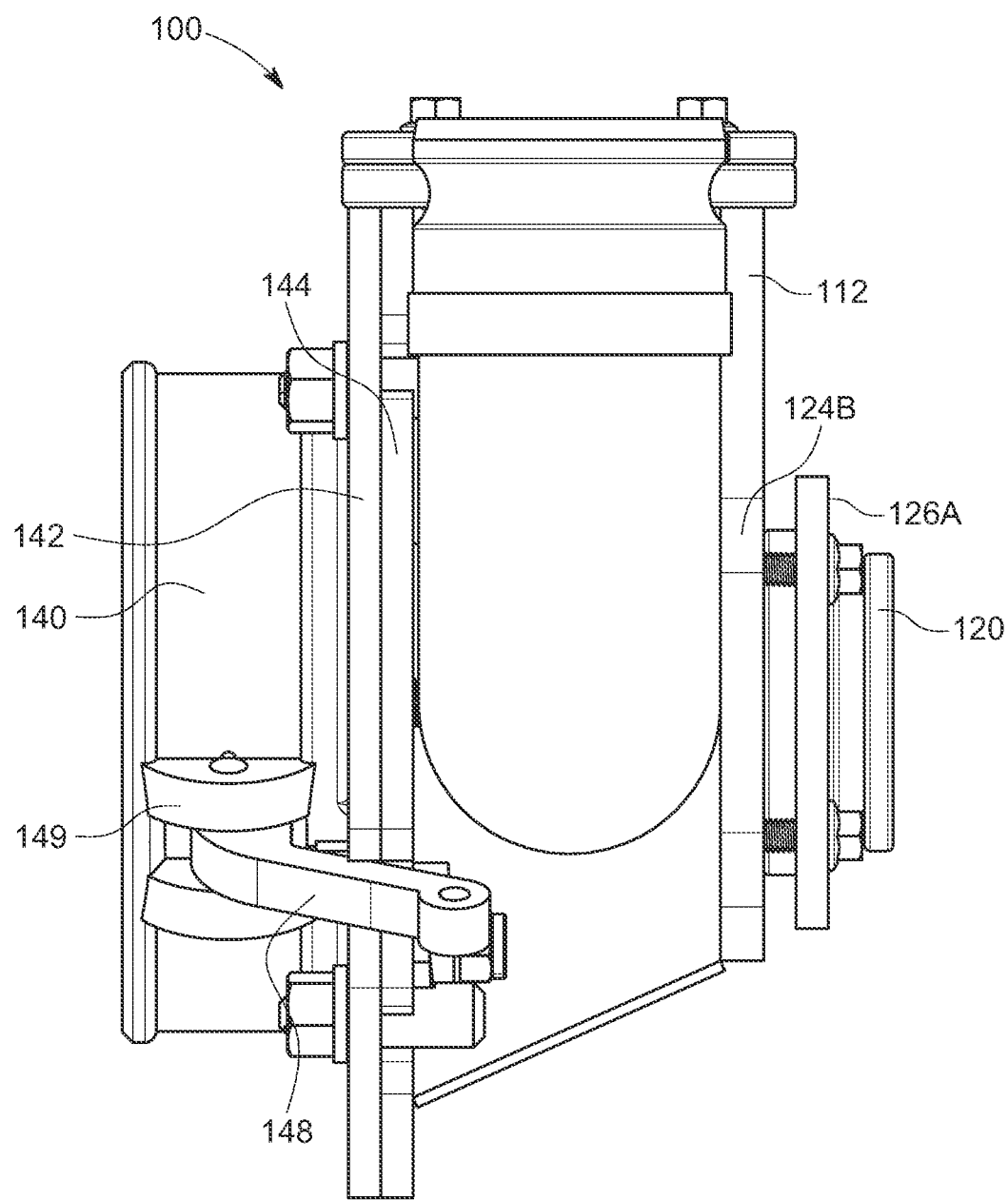
FIG. 5 illustrates a right-side view for the CIPP end cap internal roller apparatus of the disclosure described herein according to some exemplary embodiments.
Figure 6:
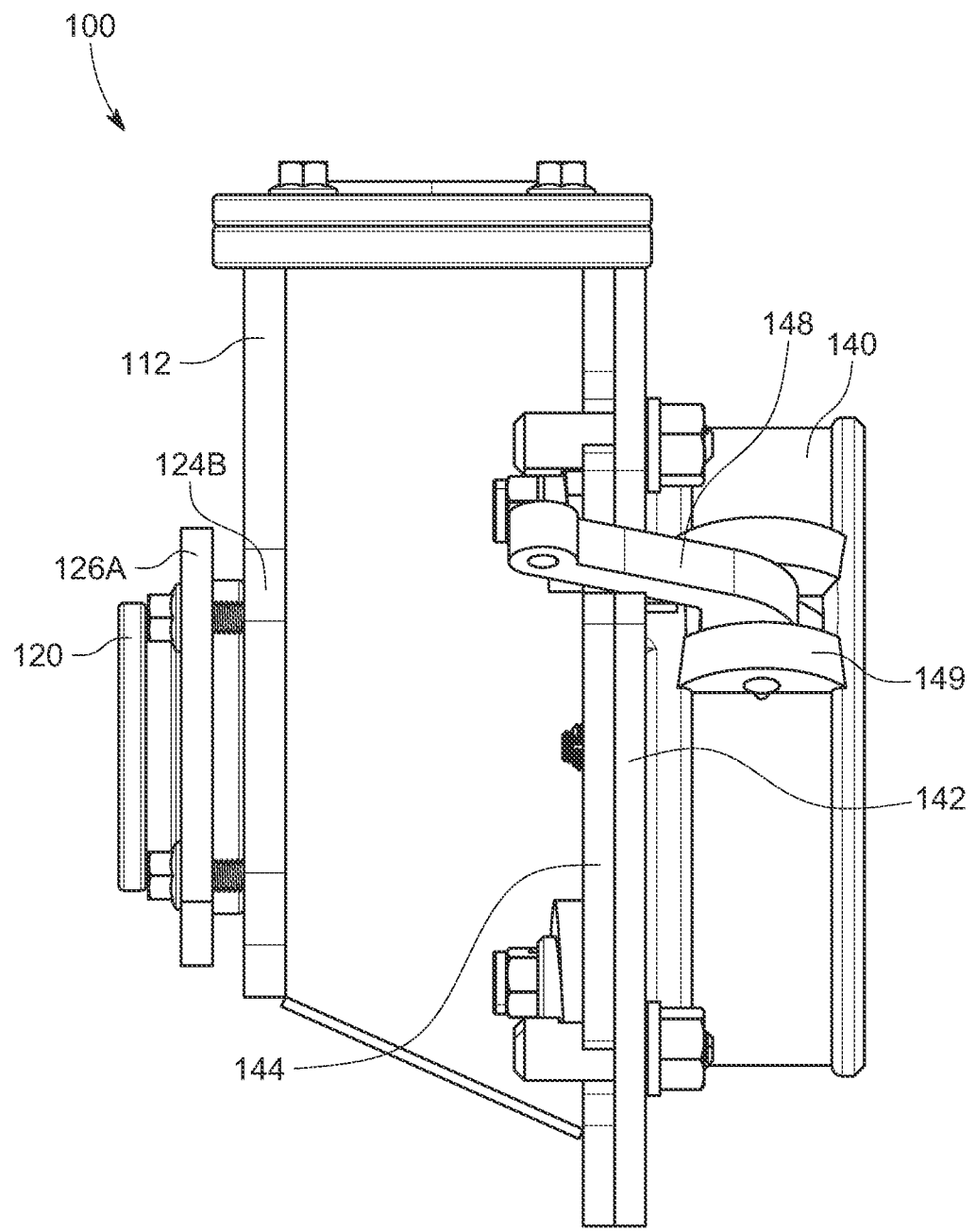
FIG. 6 illustrates a left-side view for the CIPP end cap internal roller apparatus of the disclosure described herein according to some exemplary embodiments.
Figure 7:
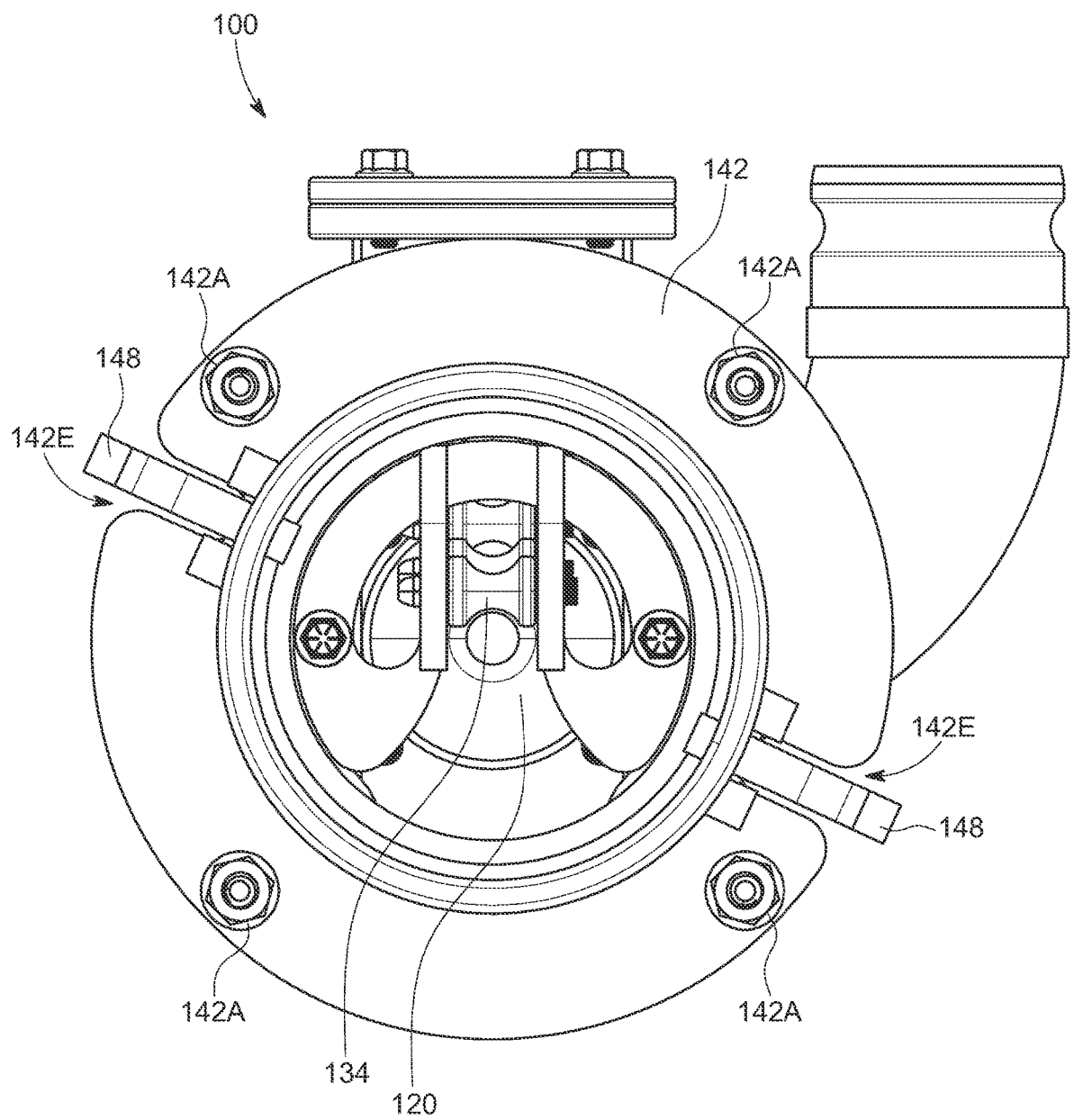
FIG. 7 illustrates a front view for the CIPP end cap internal roller apparatus of the disclosure described herein according to some exemplary embodiments.

Still referring to FIG. 2, grommet seal 120 is adapted to include an opening or orifice 120B that allows for cable 200 to pass through while maintaining an air-tight or fluid-tight seal against the outer surface of cable 200 as it passes and moves through the orifice of seal 120. Specifically, roller assembly 130 allows cable 200 to be axially aligned with orifice 120B of seal 120 from within housing 112. In some embodiments, grommet seal 120 can any type of an elastic or flexible seal, bushing, eyelet, edging, or the like and be made of rubber or any polymer-based material. Further, as shown in FIGS. 2 and 4, grommet seal 120 may include an inner ring 120A adapted to receive and seat the interior ring of member 122A, thereby allowing seal 120 to be tightly secured between members 122A and 122B, such as shown in FIG. 2, or between members 126A and 124B, such as shown in FIGS. 5-6.

Still referring to FIG. 2, roller assembly 130 is shown disposed at least partially within the interior space of housing 112 and at least partially disposed through an opening of the housing and within the interior space of connector 140. In particular, roller assembly 130 includes a pair of brackets 132 in an arcuate or curved configuration. Roller assembly 130 further includes a plurality of freely spinning wheels, bearings, or rollers 132 that are substantially equally spaced apart from each other and further secured and disposed between the pair of brackets 132, such as also shown in FIGS. 3-4, 7, 9A, and 9B, which will be discussed in more detail within the disclosure. Here, each roller 134 is also disposed in an arcuate or curved pattern, configuration, or orientation relative to a horizontal and vertical plane that generally follows the arcuate configuration of brackets 132. In addition, in one exemplary embodiment, brackets 132 may also include an additional stiffening bracket 136 to provide additional structural support and stability to the roller assembly. Further, an O-ring member 146 may also be optionally disposed within the interior space of connector 140 (or plate 144 of housing 112) in order to provide tight-fit seal and engagement with a connected external pipe, external apparatus, or the like. As shown in FIG. 2, the short and compact width A1 of apparatus 100 allows the apparatus to be easily inserted below ground where there is minimal lateral space or room. In addition, sloped bottom member 114 of housing 112 also allows apparatus 100 (including connector 140) to easily and quickly align with the pipe end cap 300 and prevent the lower end from unnecessarily protruding outwards, thereby contributing to the compact nature of apparatus 100.

Figure 8:
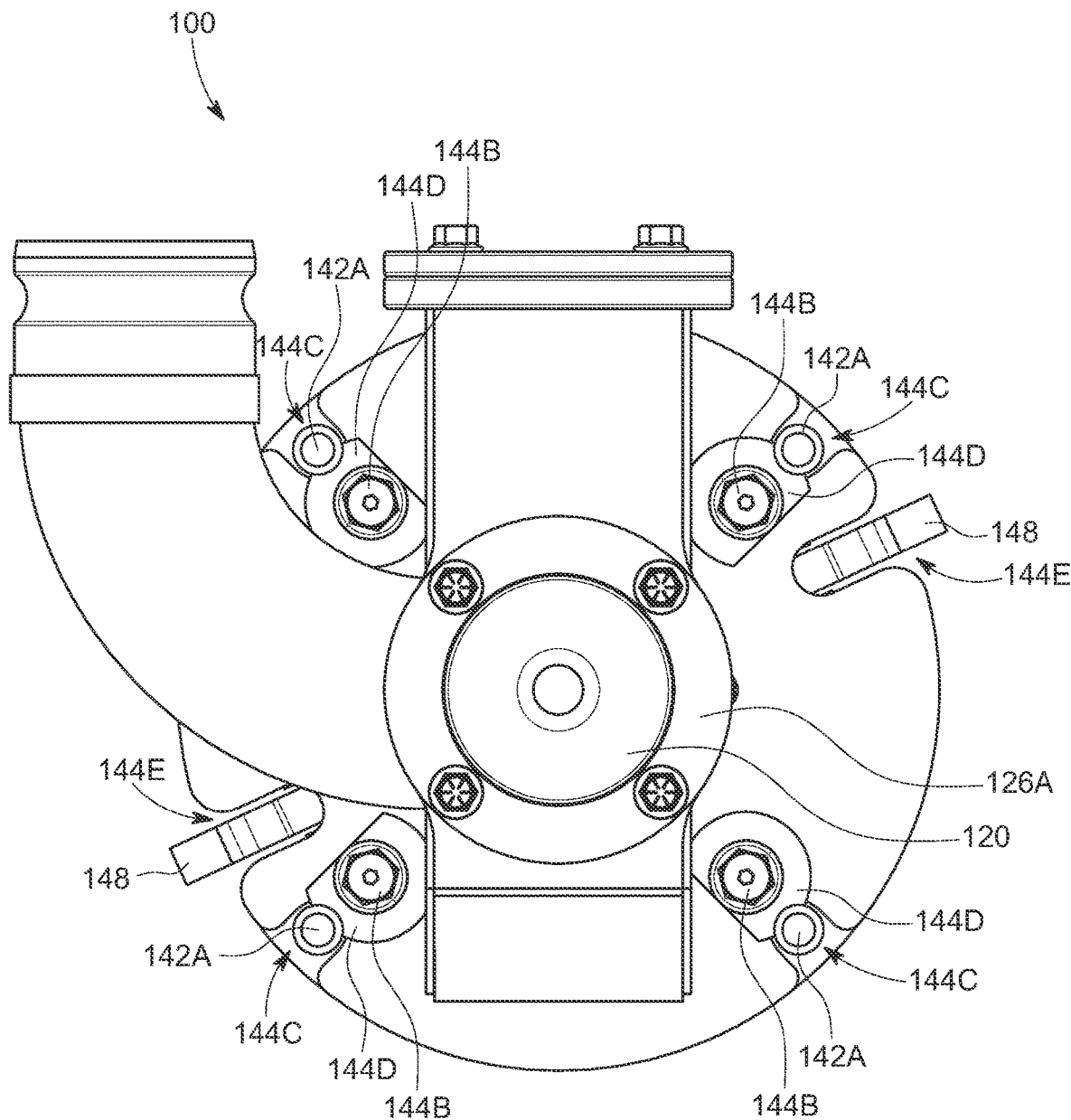
FIG. 8 illustrates a rear view for the CIPP end cap internal roller apparatus of the disclosure described herein according to some exemplary embodiments.

Referring to FIGS. 3-4, 7, and 8, various views for the CIPP end cap internal roller apparatus 100 of the disclosure described herein are shown. Here, plate 142 is shown having multiple protruding male members 142A disposed in a radial configuration from its interior face. Here, each male member 142A can include any type of protrusion or fastener, such as a threaded bolt or rivet, that is secured or affixed to plate 142. Moreover, opposing plate 144 can include multiple openings, slots, or notches 144C in a radial configuration around the perimeter of plate 144. Here, each male member 142A of plate 142 is received within each notch 144C of opposing plate 144. Further, plates 142 and 144 are securely coupled to each other via the tightening of bolts 144B and their corresponding washers or cam members 144D that abuts within a slot of each male member 142A, such as shown in FIG. 8. Here, bolt 144B can be used as a mounting bolt for washer or cam member 144D. Further, bolts 144B and washers or cam members 144D can use a rotary cam lock method to tighten. Specifically, as shown in more detail in FIG. 4A, washers or cam members 144D can take the form of a helical ramp, while each male member 142A includes a cutaway or slot 143A that has a matching pitch of slope in its upper surface in relation to the plate in which it is mounted on. Each washer or cam member 144D can be rotated such that it is aligned within slot 143A of male member 142A.

Referring to FIGS. 5-8, various views for the flanged end cap pipe connector 140 and latching members 148 are shown for the CIPP end cap internal roller apparatus 100 of the disclosure described herein. As previously disclosed herein, latching members 148 are adapted to couple and secure apparatus 100 to end cap 300. In particular, each latching member 148 is coupled to a base member 149 on opposing sides of connector 140 that allows for each latching member 148 to freely rotate about an axis. Each latching member 148 can be pulled back such that they are received within each notch 142E of plate 142 and further within each notch 144E of plate 144. In operation, latching members 148 allow for quick attachment and release of assembly 100 to or from a pipe and liner end cap.

B. Roller Assembly

Referring to FIGS. 2-4, 7, and 9A-10, various views for the roller assembly 130 of the CIPP end cap internal roller apparatus 100 of the disclosure described herein are shown. As previously disclosed herein, brackets 132 of roller assembly 130 generally include an arcuate, curved, or curvilinear overall configuration. Here, a radius of curvature for the lower end region of brackets 132 may range from about 1 in. to 12 in., preferably about 6 in. In particular, the smooth curvature of brackets 132 (rollers 134) is configured to prevent any type of damage to cable 200, such as kinking, breakage, and the like. Here, the arcuate configuration of roller assembly 130 allows for cable 200 to be axially aligned in a vertical direction with orifice 120B of grommet seal 120 if grommet seal 120 is secured to the top of housing 112 via member 122B, or alternatively, axially aligned in a horizontal direction with orifice 120B of grommet seal 120 if grommet seal 120 is secured to the rear/side of housing 112 via member 124B. Further, each roller 134 can be disposed on independent shafts that connect to each side of brackets 132, thereby allowing each roller 134 to independently spin about their axes. As shown in more detail in FIG. 9B, each roller may have a spindle-like or concave configuration having a smaller width or diameter near its center area that expands to a larger width or diameter towards its opposing ends. The foregoing configuration of each roller 134 is optimized to accommodate thickness of any type of rope, cord, or cable (such as cable 200) while preventing slippage of the cable by centering the cable near the middle area of each roller 134 to further ensure proper alignment of the cable along each adjacent roller as the cable moves transversely relative to each roller.

Figure 9A:
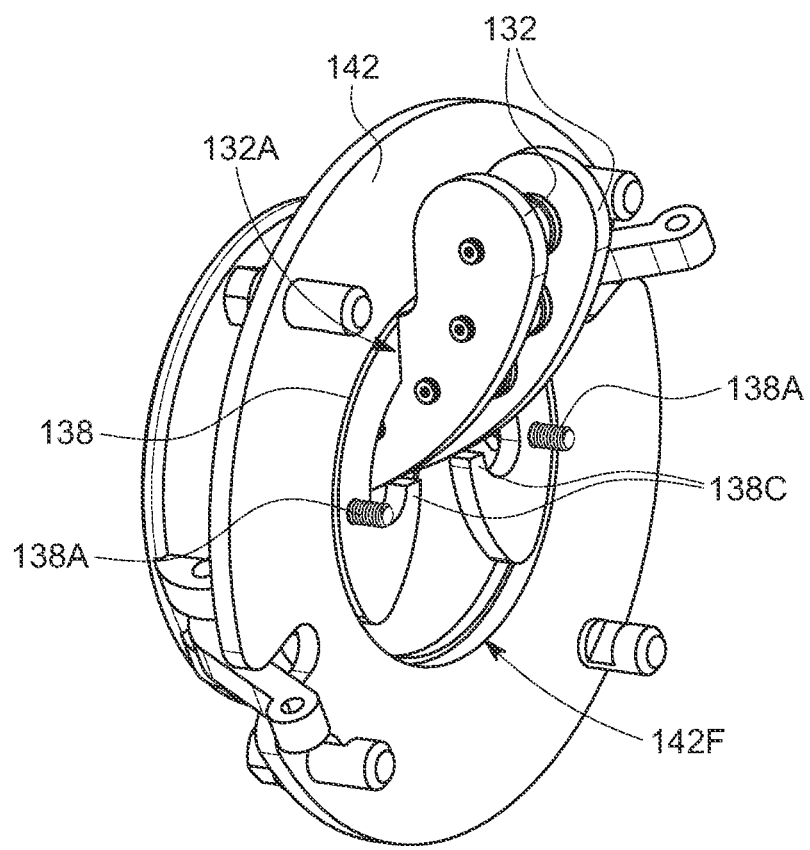
FIG. 9A illustrates a partial perspective view of a roller assembly for the CIPP end cap internal roller apparatus of the disclosure described herein according to some exemplary embodiments.
Figure 9B:
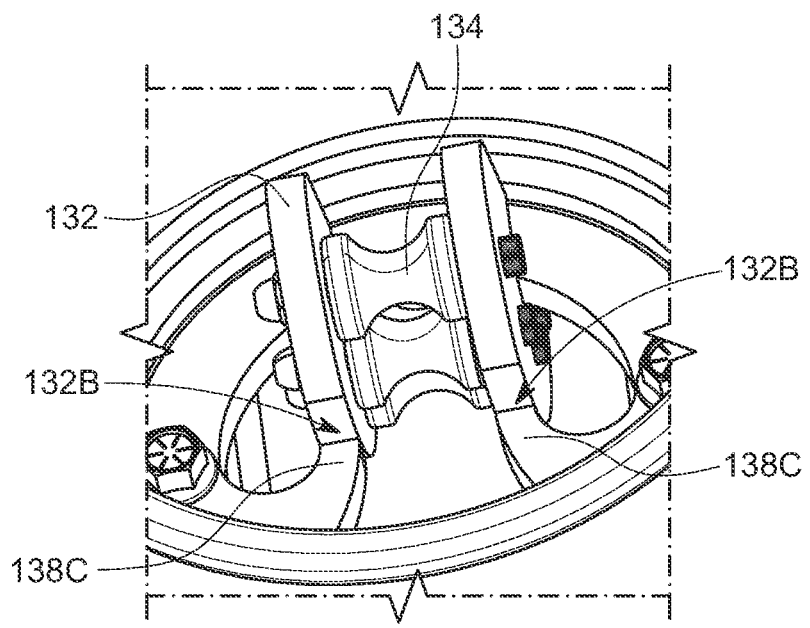
FIG. 9B illustrates a partial close-up perspective view of the roller assembly for the CIPP end cap internal roller apparatus of the disclosure described herein according to some exemplary embodiments.
Figure 10:
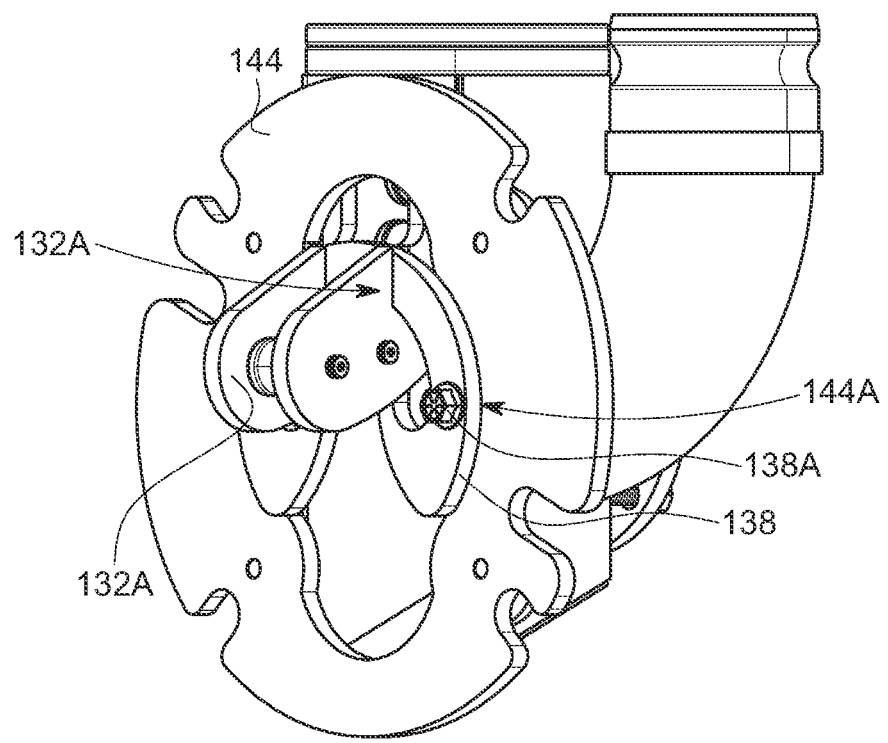
FIG. 10 illustrates another partial perspective view of the roller assembly for the CIPP end cap internal roller apparatus of the disclosure described herein according to some exemplary embodiments.
Figure 11A:
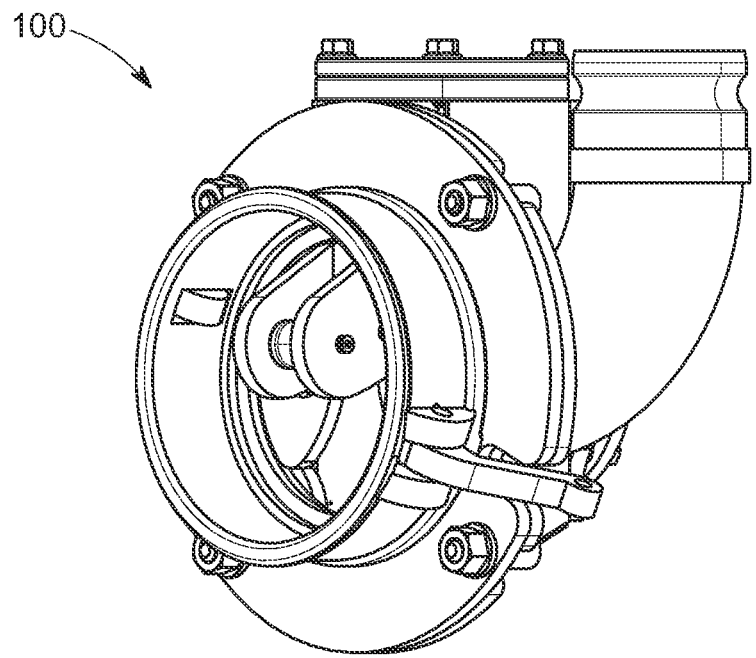
FIG. 11A illustrates another perspective front view for the CIPP end cap internal roller apparatus of the disclosure described herein according to some exemplary embodiments.
Figure 11B:
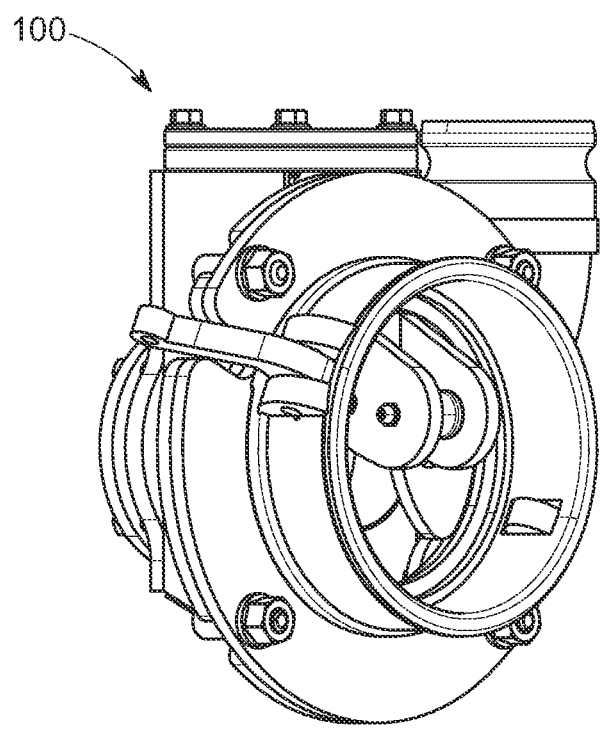
FIG. 11B illustrates another perspective front view for the CIPP end cap internal roller apparatus of the disclosure described herein according to some exemplary embodiments.
Figure 12A:
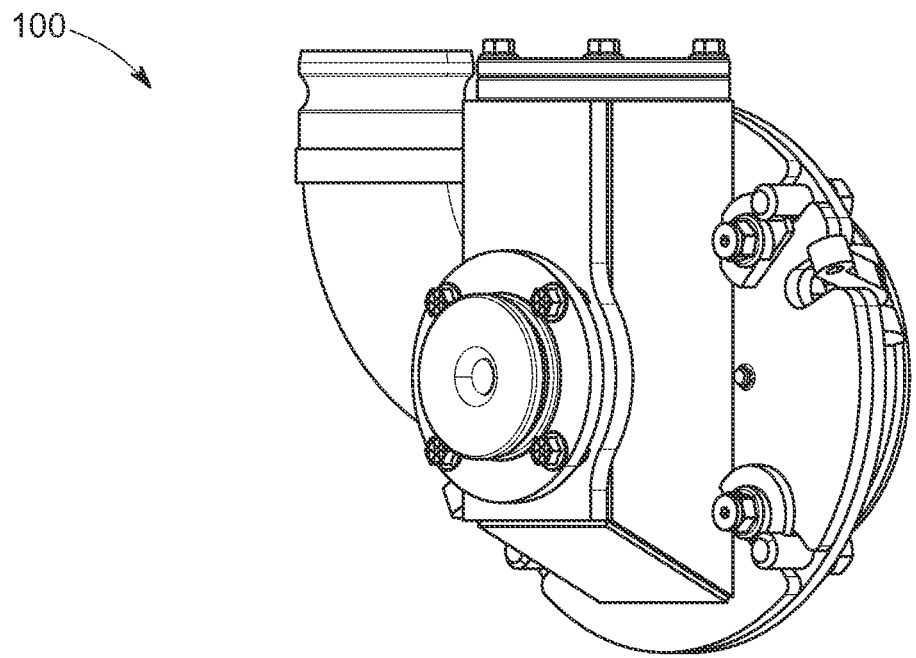
FIG. 12A illustrates a perspective rear view for the CIPP end cap internal roller apparatus of the disclosure described herein according to some exemplary embodiments.
Figure 12B:
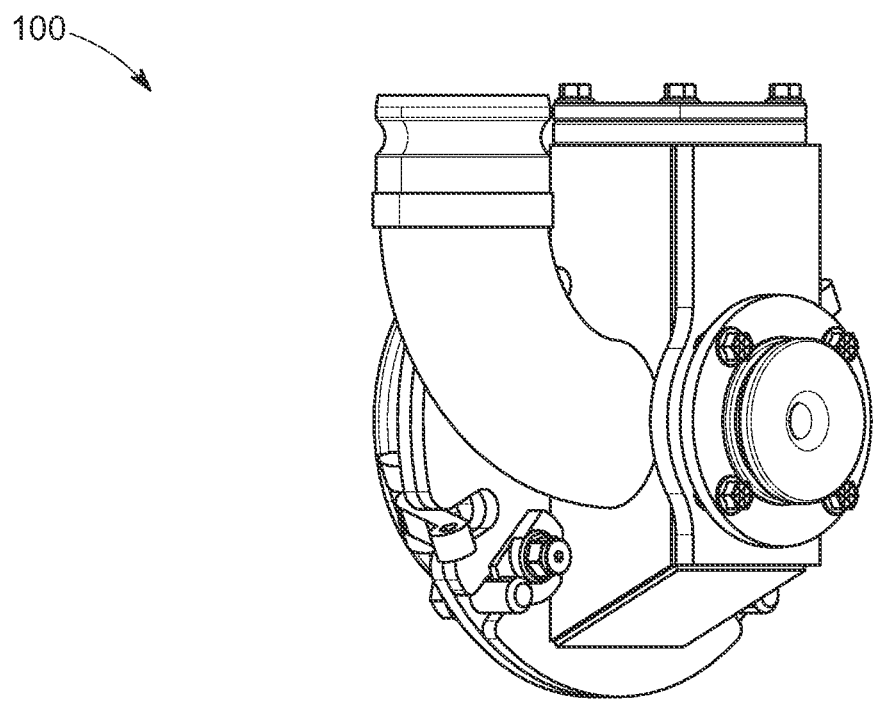
FIG. 12B illustrates another perspective rear view for the CIPP end cap internal roller apparatus of the disclosure described herein according to some exemplary embodiments.
Figure 13A:
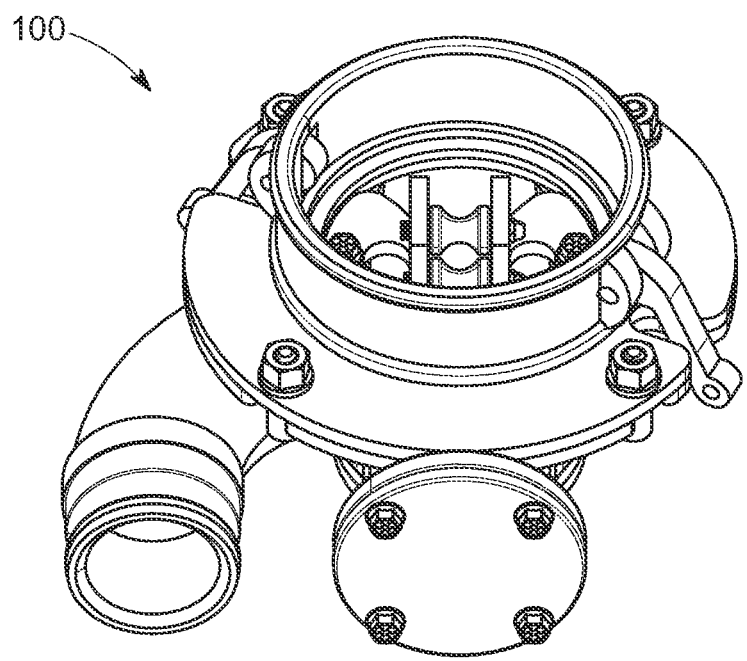
FIG. 13A illustrates a perspective top view for the CIPP end cap internal roller apparatus of the disclosure described herein according to some exemplary embodiments.
Figure 13B:
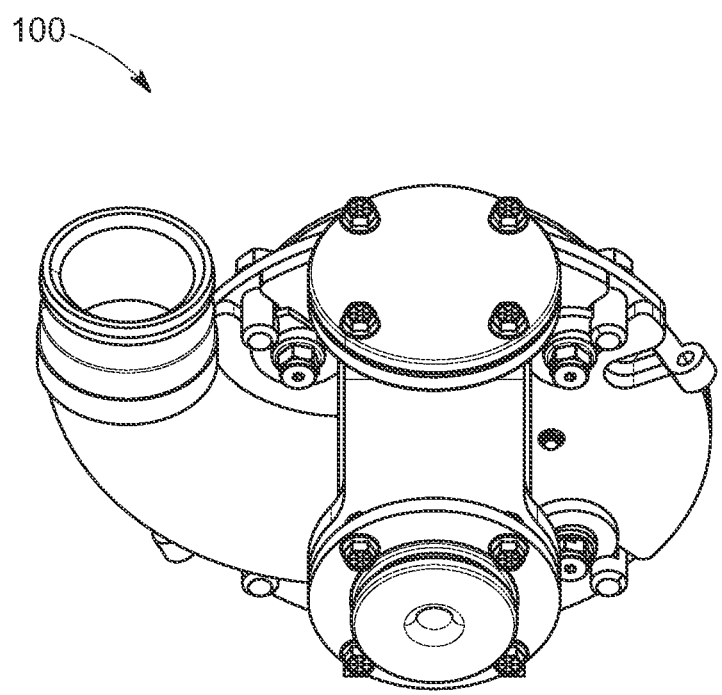
FIG. 13B illustrates a perspective rear view for the CIPP end cap internal roller apparatus of the disclosure described herein according to some exemplary embodiments.
Figure 14:
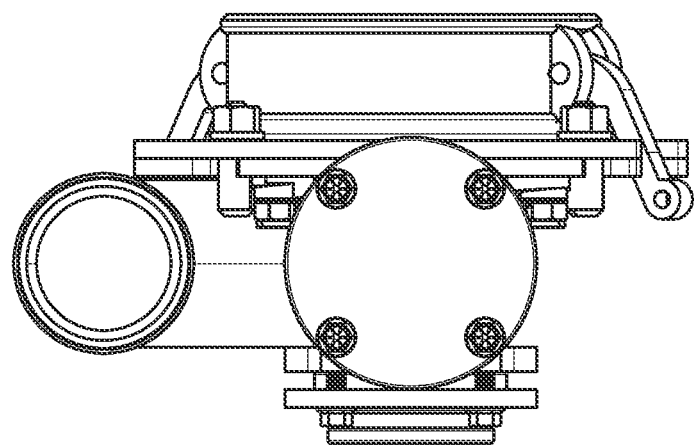
FIG. 14 illustrates a top view for the CIPP end cap internal roller apparatus of the disclosure described herein according to some exemplary embodiments.
Figure 15:
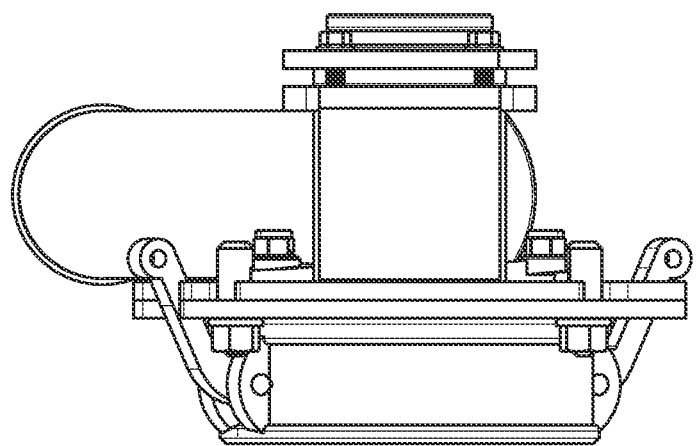
FIG. 15 illustrates a bottom view for the CIPP end cap internal roller apparatus of the disclosure described herein according to some exemplary embodiments.

Still referring to FIGS. 2-4, 7, and 9A-10, within the interior ringed opening of plate 142, there exists a second ringed opening 142F (FIG. 9A) having a slightly larger diameter adapted to receive or seat plate or bracket member 138 roller assembly 130 therein. In the assembled configuration of apparatus 100, bracket member 138 is disposed between plates 142 and 144 and is adapted to hold, secure, and stabilize brackets 132 within apparatus 100. Specifically, brackets 132 can include an opening, notch, channel, or slot 132A that is adapted to receive an upper region of bracket member 138 therein, such as shown in FIGS. 3 and 9A. Here, brackets 132 and member 138 may be welded or affixed together. Bracket member 138 can also include a pair of J-hook style arcuate members 138C at its lower region, such that the outer face, edge, or sides of each member 138B directly abuts against the lower face region of bracket members 132, such as shown in more detail in FIG. 9B. In addition, bracket member 138 may also include a pair of fasteners 138A, such as threaded bolts, adapted to couple to corresponding threaded openings 144A of plate 144, such as shown in FIGS. 3 and 10. FIGS. 11A-13B illustrates additional perspective views for the CIPP end cap internal roller apparatus 100, which incorporate elements 100-150 as discussed throughout the disclosure described herein.

C. Method of Operation

Figure 16:
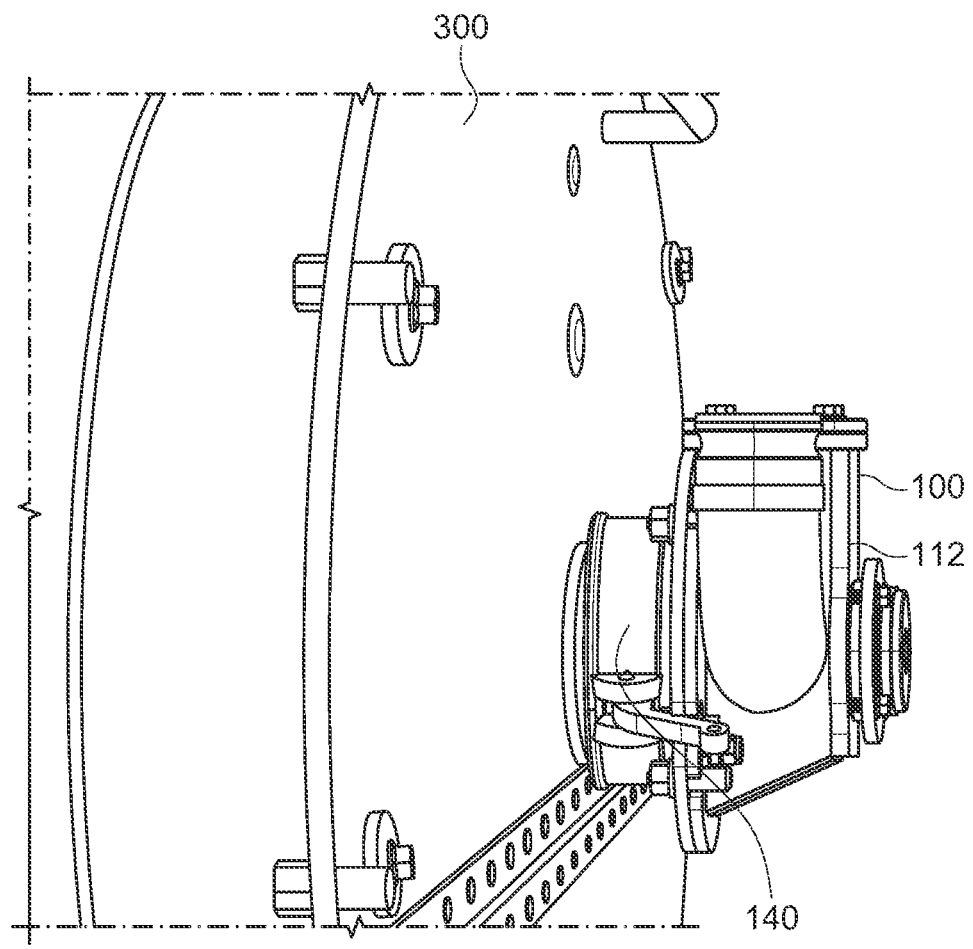
FIG. 16 illustrates a partial perspective view of the CIPP end cap internal roller apparatus of the disclosure described herein secured to an underground liner and pipe end cap according to some exemplary embodiments.
Figure 17:
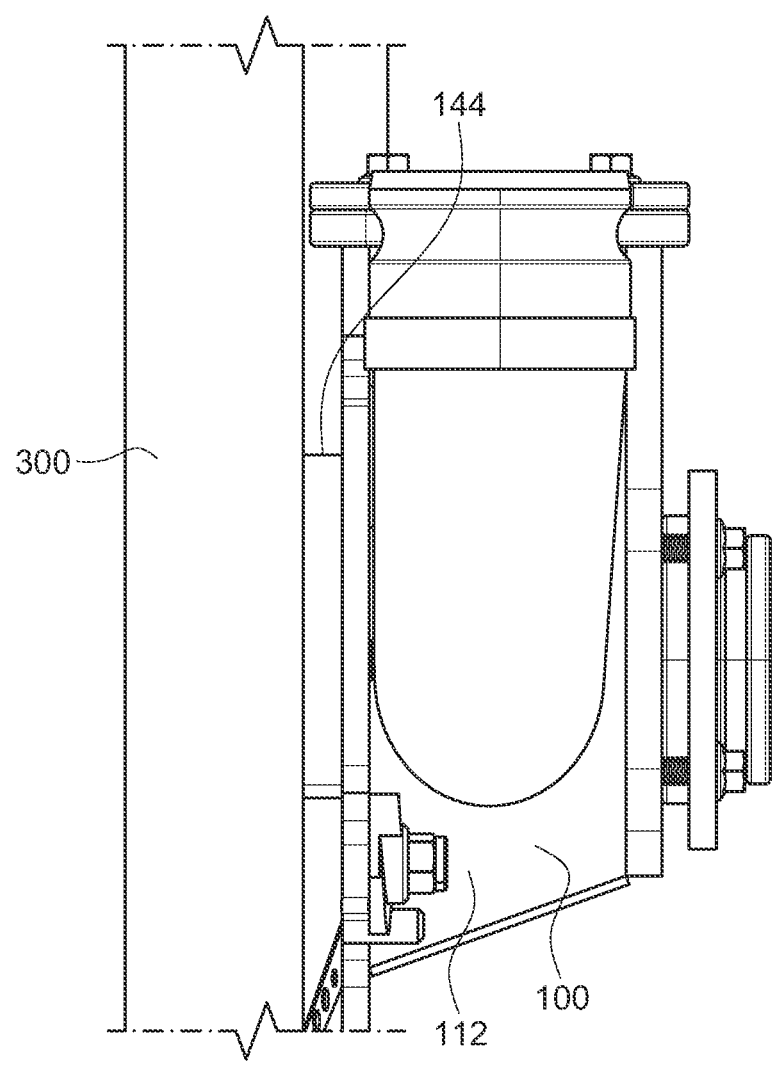
FIG. 17 illustrates a partial close-up perspective side view of the CIPP end cap internal roller apparatus of the disclosure described herein secured to an underground liner and pipe end cap according to some exemplary embodiments.
Figure 18:
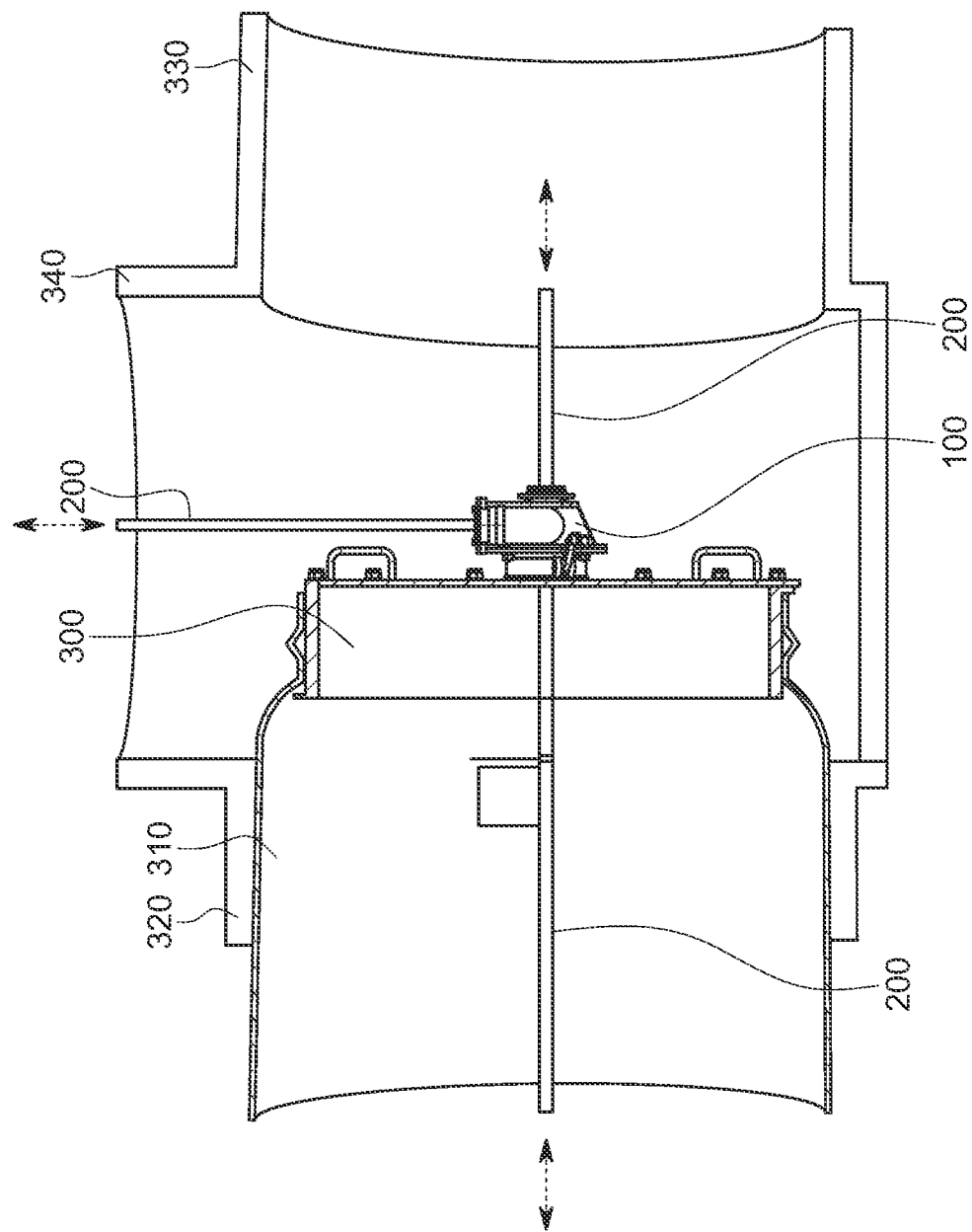
FIG. 18 illustrates a partial cross-section view of underground piping and further illustrating a method of installing and feeding one or more cables through the CIPP end cap internal roller apparatus of the disclosure described herein according to some exemplary embodiments.

Referring to FIGS. 16-18, various views for a method of installing and operating the CIPP end cap internal roller apparatus 100 for sealing operations of the disclosure described herein are shown. As shown in FIG. 18, apparatus 100 can be lowered from above ground via a bore or pipe 340 and be further secured to the face of end cap 300. In particular, end cap 300 may include an opening or mount at least partially aligns with the opening of connector 140 and further adapted to engage, lock, or secure the distal end face of connecter 140 to the face of end cap 300, such as shown in FIG. 16. Alternatively, as shown in FIG. 17, for a different mounting configuration, plate 144 of housing 112 can be directly coupled to the exterior face or mount of end cap 300 without connector 140. Here, connector 140 may also be referred to herein as an adapter. Further, cable 200 may either pass through apparatus 100 (via roller assembly 130) from its top end region or from the rear/side region, depending on the desired configuration and use. For example, cable 200 can pass bi-directionally from or to bore or pipe 340, to or from pipe 320 (and associated liner 310), or to or from pipe 330. As previously disclosed, the compact nature of apparatus 100 allows it be easily lowered and positioned below ground (including its removal) for efficient CIPP sealing operations of a pipe liner. In other embodiments, the angle at which cable 200 exits apparatus 100 may also be configurable, such as via adjusting the orientation of roller assembly 130 within apparatus 100. In other embodiments, apparatus 100 may also include additional roller assemblies to provide further support and operate as a guide for cable 200.

From the foregoing it will be seen that the present disclosure described herein is one well adapted to attain all ends and objectives herein-above set forth, together with the other advantages which are obvious and which are inherent to the invention.

Since many possible embodiments may be made of the invention without departing from the scope thereof, it is to be understood that all matters herein set forth or shown in the accompanying drawings are to be interpreted as illustrative, and not in a limiting sense.

While specific embodiments have been shown and discussed, various modifications may of course be made, and the invention is not limited to the specific forms or arrangement of parts described herein, except insofar as such limitations are included in following claims. Further, it will be understood that certain features and sub-combinations are of utility and may be employed without reference to other features and sub-combinations. This is contemplated by and is within the scope of the claims.

What is claimed is:

1. A pipe end cap roller apparatus, comprising:
    a housing comprising an opening, wherein the housing further comprises an interior space;
    a roller assembly, wherein the roller assembly is at least partially disposed within the interior space of the housing and at least partially disposed through the opening of the housing, and wherein the roller assembly comprises a plurality of rotatable members assembled in a curved orientation and secured between a first bracket and a second bracket, wherein each of the first and second brackets comprise a proximal end and a distal end, wherein each of the first and second brackets comprise a slot or channel near a middle region of the first and second brackets, and wherein a bottom surface of each of the first bracket and second bracket comprise an arcuate configuration that follows the curved orientation of the plurality of rotatable members; and
    a pipe coupling member coupled to the opening of the housing, wherein the pipe coupling member comprises an interior space;
    wherein the proximal end of each first bracket and second bracket is disposed within the interior space of the pipe coupling member and the distal end of each first and second bracket is disposed within the interior space of the housing.

2. The pipe end cap roller apparatus of claim 1, further comprising:
    a grommet seal coupled to an upper region or side region of the housing, wherein the grommet seal comprises an opening.

3. The pipe end cap roller apparatus of claim 2, wherein the opening of the grommet seal is at least partially aligned with the roller assembly.

4. The pipe end cap roller apparatus of claim 1, further comprising a third bracket, wherein the third bracket is secured to the first bracket and second bracket and disposed within each slot or channel of the first bracket and second bracket.

5. The pipe end cap roller apparatus of claim 4, wherein the housing further comprises a first plate and the pipe coupling member comprises a second plate.

6. The pipe end cap roller apparatus of claim 5, wherein the third bracket is coupled to the first plate and second plate, and further disposed between the first plate and second plate.

7. The pipe end cap roller apparatus of claim 6, wherein the third bracket comprises a first arcuate member and a second arcuate member, wherein the first arcuate member is adapted to engage a lower region of the first bracket and the second arcuate member is adapted to engage a lower region of the second bracket.

8. The pipe end cap roller apparatus of claim 1, further comprising an air manifold member in fluid communication with the interior space of the housing.

9. A pipe end cap roller system, comprising:
    a casing having a pressure sealed interior compartment;
    the casing further comprising a coupling member, wherein the coupling member is at a transverse orientation relative to the casing;
    a grommet seal coupled to the casing; and
    a roller assembly coupled to the casing and at least partially disposed within the casing, wherein the roller assembly comprises a plurality of wheels or a plurality of rollers disposed in a curved configuration relative to a horizontal and vertical plane, and wherein the plurality of wheels or plurality of rollers are secured between a first bracket and a second bracket, wherein each of the first and second brackets comprise a proximal end and a distal end, wherein each of the first and second brackets comprise a slot or channel near a middle region of the first and second brackets, and wherein a lower region of each of the first bracket and second bracket comprise an arcuate configuration that substantially follows the curved configuration of the plurality of wheels or plurality of rollers;
    wherein the proximal end of each first bracket and second bracket is disposed within an interior compartment of the coupling member and the distal end of each first bracket and second bracket is disposed within the interior compartment of the casing.

10. The pipe end cap roller system of claim 9, wherein the grommet seal is coupled to an upper region or side region of the casing.

11. The pipe end cap roller system of claim 10, wherein the upper region or side region of the casing comprise a pair of flanged members, wherein the pair of flanged members are configured to secure the grommet seal.

12. The pipe end cap roller system of claim 11, wherein the grommet seal comprises an orifice adapted to receive a cable or line therethrough, and wherein the orifice is at least partially aligned with the roller assembly such that the cable or line is axially aligned with the orifice.

13. The pipe end cap roller system of claim 9, further comprising a third bracket, wherein the third bracket is secured to the first bracket and second bracket and disposed within each slot or channel of the first bracket and second bracket.

14. The pipe end cap roller system of claim 13, wherein the casing further comprises a first plate and the coupling member comprises a second plate.

15. The pipe end cap roller system of claim 14, wherein the third bracket is coupled to the first plate and second plate and further disposed between the first plate and second plate.

16. A pipe end cap roller system, comprising:
   a body, wherein the body comprises a top opening, a first side opening, a second side opening, and an interior space;
   a cover secured to either the top opening or first side opening of the body leaving at least one of the top opening or first side opening uncovered;
   a grommet seal having an opening secured to the uncovered top opening or uncovered first side opening of the body;
   the body further comprising a flanged member, wherein the flanged member is secured to the second side opening of the body;
   a pipe coupling member coupled to the flanged member, wherein the pipe coupling member comprises an interior space; and
   a plurality of rotatable members at least partially disposed within an interior space of the body in a curved orientation, wherein the plurality of rotatable members are secured between a first bracket and a second bracket, wherein each of the first and second brackets comprise a proximal end and a distal end, wherein each of the first and second brackets comprise a slot or channel near a middle region of the first and second brackets, and wherein the first bracket and second bracket each comprise a bottom face in an arcuate configuration that substantially follows the curved orientation of the plurality of rotatable members;
   wherein the proximal end of each first bracket and second bracket is disposed within the interior space of the pipe coupling member and the distal end of each first and second bracket is disposed within the interior space of the body.

\* \* \* \* \*